US012652635B2

(12) United States Patent
Sabeur et al.

(10) Patent No.: US 12,652,635 B2
(45) Date of Patent: Jun. 9, 2026

(54) INTERNET PROTOCOL MULTIMEDIA SUBSYSTEM (IMS) SLICING IN WIRELESS COMMUNICATION NETWORKS

(71) Applicant: T-MOBILE INNOVATIONS LLC, Overland Park, KS (US)

(72) Inventors: Nassereddine Sabeur, Bellevue, WA (US); Joel Lee Arends, Renton, WA (US); Saqib Badar, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 362 days.

(21) Appl. No.: 18/313,084

(22) Filed: May 5, 2023

(65) Prior Publication Data

US 2024/0373384 A1 Nov. 7, 2024

(51) Int. Cl.
| | |
|---|---|
| *H04W 60/00* | (2009.01) |
| *H04L 65/1016* | (2022.01) |
| *H04L 65/1045* | (2022.01) |
| *H04W 48/18* | (2009.01) |
| *H04W 80/10* | (2009.01) |

(52) U.S. Cl.
CPC ......... *H04W 60/00* (2013.01); *H04L 65/1016* (2013.01); *H04W 48/18* (2013.01); *H04L 65/1045* (2022.05); *H04W 80/10* (2013.01)

(58) Field of Classification Search
CPC ..... H04W 60/00; H04W 48/18; H04W 80/10; H04W 8/20; H04W 60/04; H04L 65/1016; H04L 65/1045; H04L 67/53; H04L 65/1063; H04L 65/1073; H04L 67/306
See application file for complete search history.

(56) References Cited

U.S. PATENT DOCUMENTS 7,975,037 B2 * 7/2011 Tai ...................... H04Q 3/0045
709/240
11,128,673 B2 9/2021 Russell et al.
(Continued)

FOREIGN PATENT DOCUMENTS

| EP | 4142253 A1 | 3/2023 |
|---|---|---|
| WO | 2021044271 A1 | 3/2021 |

OTHER PUBLICATIONS

"3rd Generation Partnership Project; Technical Specification Group Core Network and Terminals; Study on enhanced. IP Multimedia Subsystem (IMS) to 5GC integration Phase 2; CT WG4 aspects (Release 17)"; 3GPP TR 23.700-12;. Mar. 2022; pp. 1-22; V17.1.0; 3GPP; Sophia Antipolis, France.

*Primary Examiner* — Santiago Garcia

(57) ABSTRACT

Various embodiments comprise wireless communication networks to support slicing in an Internet Protocol Multimedia Subsystem (IMS) core. In some examples, the wireless communication network comprises a multimedia function and a network data system. The multimedia function receives a registration request indicating a User Equipment (UE) Identifier (ID). The multimedia function queries a network data system for UE subscription information. The network data system correlates the UE ID to slice information associated with a UE and indicates the slice information to the multimedia function. The multimedia function receives the slice information from the network data system and responsively caches the slice information in association with the UE ID.

20 Claims, 11 Drawing Sheets

(56)　　　　　References Cited

U.S. PATENT DOCUMENTS

| | | | | |
|---|---|---|---|---|
| 2008/0273704 | A1* | 11/2008 | Norrman | H04L 63/08 |
| | | | | 380/278 |
| 2009/0089435 | A1* | 4/2009 | Terrill | H04L 65/1016 |
| | | | | 709/227 |
| 2010/0257272 | A1* | 10/2010 | Belinchon | H04L 65/1016 |
| | | | | 709/227 |
| 2012/0195414 | A1* | 8/2012 | Yang | H04L 65/1059 |
| | | | | 379/93.14 |
| 2013/0003699 | A1* | 1/2013 | Liu | H04W 8/082 |
| | | | | 370/328 |
| 2013/0343279 | A1* | 12/2013 | Keller | H04L 65/1063 |
| | | | | 370/328 |
| 2021/0021647 | A1* | 1/2021 | Cai | H04L 45/306 |
| 2021/0152615 | A1* | 5/2021 | Karampatsis | H04L 65/1016 |
| 2022/0014939 | A1* | 1/2022 | Colom Ikuno | H04W 8/12 |
| 2022/0104313 | A1* | 3/2022 | Park | H04W 88/06 |
| 2022/0225149 | A1* | 7/2022 | Yan | G06F 9/547 |
| 2022/0232376 | A1 | 7/2022 | Dauneria et al. | |
| 2022/0338152 | A1* | 10/2022 | Foti | H04W 60/005 |
| 2023/0062145 | A1* | 3/2023 | Sabeur | H04W 24/10 |
| 2023/0156649 | A1* | 5/2023 | Srivastava | H04W 72/51 |
| | | | | 455/435.1 |
| 2023/0231851 | A1* | 7/2023 | Kunz | H04W 60/06 |
| | | | | 455/411 |
| 2024/0267993 | A1* | 8/2024 | Chun | H04W 76/38 |
| 2024/0298229 | A1* | 9/2024 | Chun | H04W 36/008357 |

* cited by examiner

201 RECEIVING A REGISTRATION REQUEST INDICATING A USER EQUIPMENT (UE) IDENTIFIER (ID).

202 QUERYING A NETWORK DATA SYSTEM FOR UE SUBSCRIPTION INFORMATION.

203 RECEIVING SLICE INFORMATION FROM THE NETWORK DATA SYSTEM AND RESPONSIVELY CACHING THE SLICE INFORMATION IN ASSOCIATION WITH THE UE ID.

200

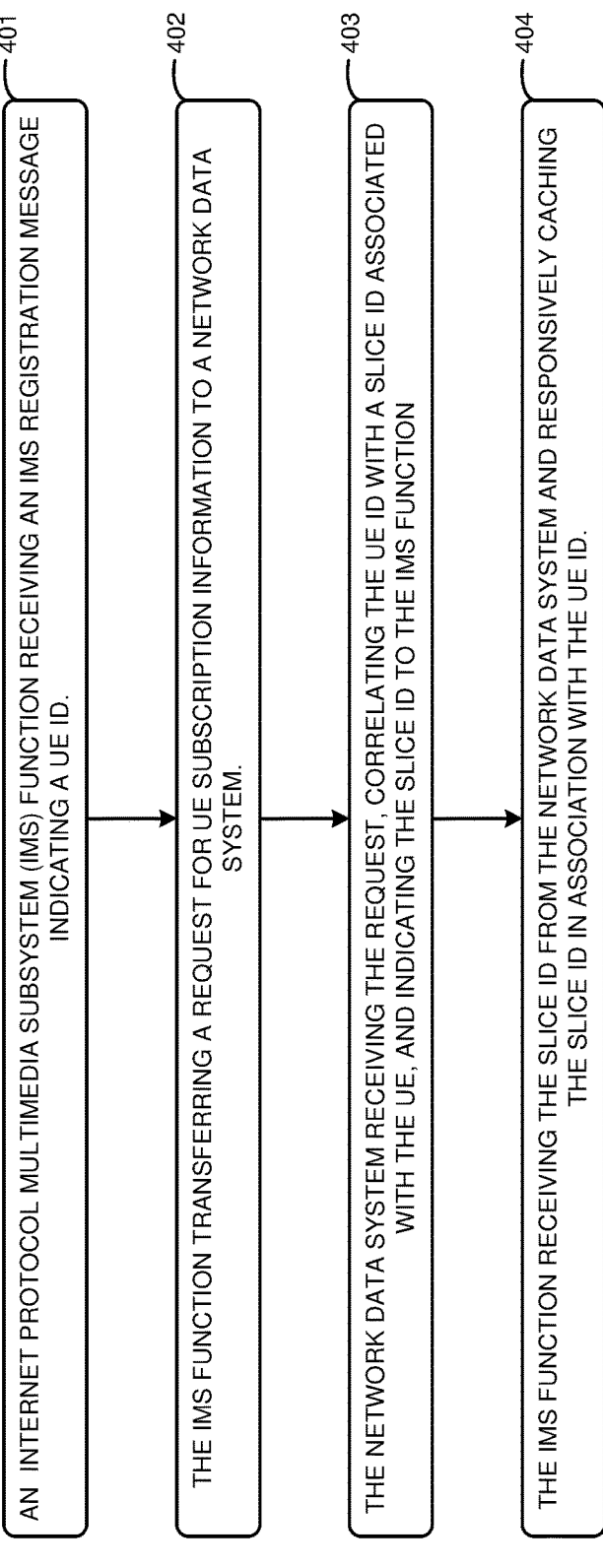

400

401 AN INTERNET PROTOCOL MULTIMEDIA SUBSYSTEM (IMS) FUNCTION RECEIVING AN IMS REGISTRATION MESSAGE INDICATING A UE ID.

402 THE IMS FUNCTION TRANSFERRING A REQUEST FOR UE SUBSCRIPTION INFORMATION TO A NETWORK DATA SYSTEM.

403 THE NETWORK DATA SYSTEM RECEIVING THE REQUEST, CORRELATING THE UE ID WITH A SLICE ID ASSOCIATED WITH THE UE, AND INDICATING THE SLICE ID TO THE IMS FUNCTION

404 THE IMS FUNCTION RECEIVING THE SLICE ID FROM THE NETWORK DATA SYSTEM AND RESPONSIVELY CACHING THE SLICE ID IN ASSOCIATION WITH THE UE ID.

FIGURE 4

INTERNET PROTOCOL MULTIMEDIA SUBSYSTEM (IMS) SLICING IN WIRELESS COMMUNICATION NETWORKS

TECHNICAL FIELD

Various embodiments of the present technology relate to Internet Protocol Multimedia Subsystem (IMS), and more specifically, to the enablement of Fifth Generation Core (5GC) network slicing in IMS.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices. The cores often organize the network functions into wireless network slices to customize service delivery to the wireless user devices.

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call State Control Function (CSCF), Telephony Application Server (TAS), and Short Message Service Application Server (SMS AS).

When a wireless user device attaches to a wireless network core over a wireless access node, the wireless network core transfers network addresses for the IMS to the wireless user device. To initiate a voice calling or video conferencing session provided by the IMS, the wireless user device generates a SIP invite message to initiate the requested IMS session (e.g., a voice call) with another wireless user device. The wireless user device transfers the SIP invite message to the wireless network core via the wireless access node. The wireless network core routes the SIP invite message to the IMS. The IMS transfers a new SIP invite message to the other wireless user device to setup the IMS session.

Unfortunately, wireless communication networks do not efficiently implement network slicing in IMS. Moreover, the IMS does not effectively guarantee a minimum Quality-of-Service (QOS) to the wireless user devices during IMS sessions.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for implementing network slicing in Internet Protocol Multimedia Subsystem (IMS) cores. Some embodiments comprise a method of operating a wireless communication network to support network slicing in a multimedia system. The method comprises a multimedia function receiving a registration request indicating a User Equipment (UE) Identifier (ID). The method further comprises the multimedia function querying a network data system for UE subscription information. The method further comprises the multimedia function receiving slice information from the network data system and responsively caching the slice information in association with the UE ID.

Some embodiments comprise a wireless communication network configured to support network slicing in a multimedia system. The wireless communication network comprises a multimedia function that receives a registration request indicating a UE ID. The multimedia function queries a network data system for UE subscription information. The network data system correlates the UE ID to slice information associated with the UE and indicates the slice information to the multimedia function. The multimedia function receives the slice information from the network data system and responsively caches the slice information in association with the UE ID.

Some embodiments comprise a method of operating a wireless communication network to support network slicing in an Internet Protocol Multimedia Subsystem (IMS) core. The method comprises a Proxy-Call State Control Function (P-CSCF) receiving an IMS registration message indicating a UE ID for a UE. The method further comprises the P-CSCF transferring a request for UE subscription information to a Unified Data Management (UDM). The method further comprises the UDM receiving the request, correlating the UE ID with a slice ID associated with the UE, and indicating the slice ID to the P-CSCF. The method further comprises the P-CSCF receiving slice ID from the UDM and responsively caching the slice ID in association with the UE ID.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 illustrates an exemplary operation of the wireless communication network to support network slicing in a multimedia system.

Figure 1:
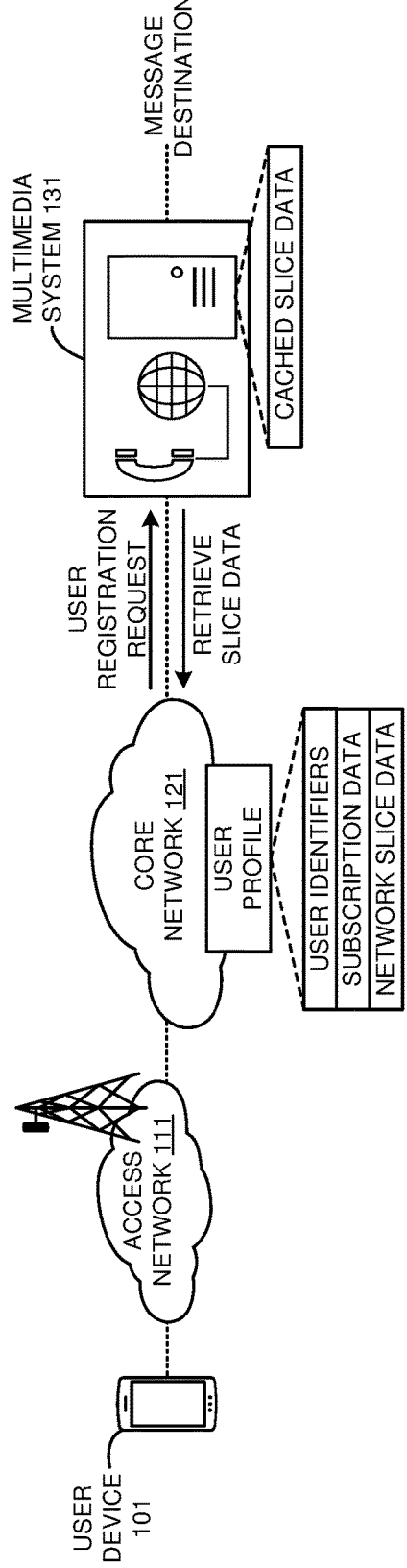
FIG. 1 illustrates a wireless communication network to support network slicing in a multimedia system.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to support network slicing in a multimedia system. Wireless communication network 100 delivers services like machine communications, internet-access, media-streaming, or some other wireless communications product. Wireless communication network 100 comprises user device 101, access network 111, core network 121, and multimedia system 131. In other examples, wireless network communication network 100 may comprise additional or different elements than those illustrated in FIG. 1.

Various examples of network operation and configuration are described herein. In some examples, user device 101 attaches to core network 121 over access network 111. User device 101 transfers a registration request for delivery to multimedia system 131 to receive multimedia services like voice calling, video conferencing, text messaging, and the like. Core network 121 receives the registration request and forwards the request to multimedia system 131. The registration request comprises a device Identifier (ID) that identifies user device 101. In response to receiving the registration request, multimedia system 131 queries a data system in core network 121 for user subscription information for user device 101. For example, multimedia system 131 may transfer a slice information request to a Unified Data Management (UDM) in core network 121 that stores a user subscriber profile for user device 101. The data system in core network 121 indicates slice information for user device 101 to multimedia system 131. Multimedia system 131 registers user device 101 and caches the slice information for user device 101 in association with the device ID for user device 101.

Wireless communication network 100 provides wireless data services to user device 101. Exemplary user devices include phones, computers, vehicles, robots, and sensors. Access network 111 exchanges wireless signals with user device 101 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or another type of edge system to provide the backhaul data links and edge computing services between access network 111 and core network 121.

Access network 111 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are coupled to network functions in core network 121.

Core network 121 and multimedia system 131 are representative of computing systems that provide wireless data services to user device 101 over access network 111. The computing systems of core network 121 execute the network functions to provide wireless data services to user device 101 over access network 111. Exemplary network functions include Access and Mobility Management Function (AMF), Session Management Function (SMF), and User Plane Function (UPF). Core network 121 stores a user profile for user device 101 that comprises information like user identifies, subscription data, and network slice data. Core network 121 may comprise a Fifth Generation Core (5GC) architecture and/or an Evolved Packet Core (EPC) architecture. The computing systems of multimedia system 131 execute multimedia functions to provide services like voice calling and text messaging to user device 101. Exemplary multimedia functions include Call State Control Function (CSCF). Multimedia system 131 may comprise an Internet Protocol Multimedia Subsystem (IMS) core architecture. For example, multimedia system 131 may receive a text message sent by user device 101 and route the text message to the message destination. Multimedia system 131 retrieves network slice data for user device 101 from core network 121 in response to a registration request from user device 101. Multimedia system 131 caches the network slice data for user device 101 to enable multimedia system network slicing.

Figure 2:
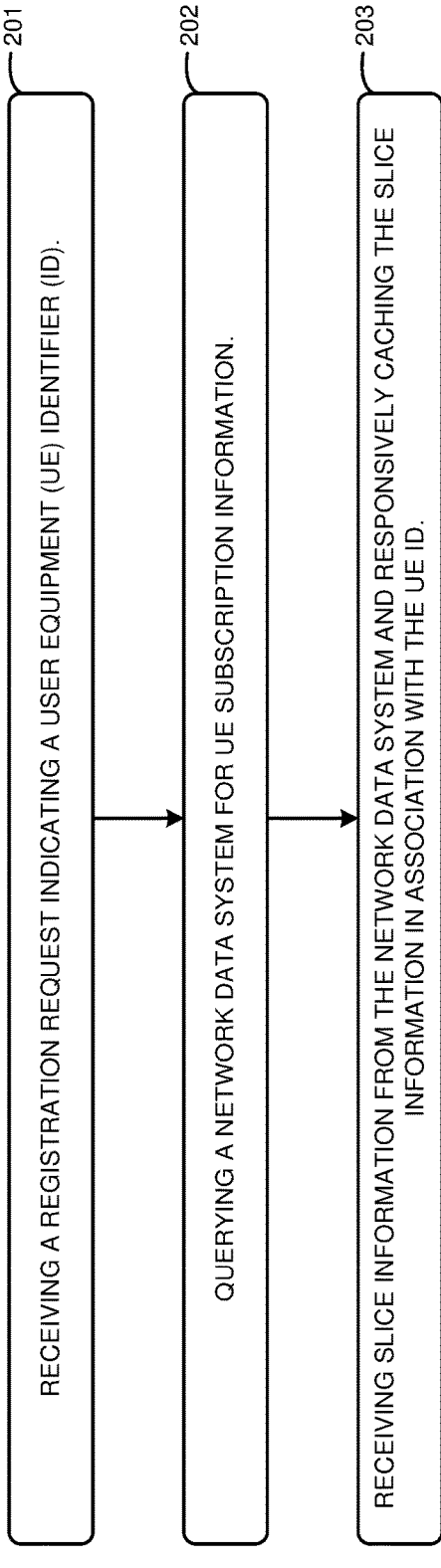
FIG. 2 illustrates an exemplary operation of the wireless communication network to support network slicing in the multimedia system.

FIG. 2 illustrates process 200. Process 200 comprises an exemplary operation of wireless communication network 100 to support network slicing in multimedia system 131. The operation may vary in other examples. The operations of process 200 comprise receiving a registration request indicating a UE ID (step 201). The operations further comprise querying a network data system for UE subscription information (step 202). The operations further comprise receiving slice information from the network data system and responsively caching the slice information in association with the UE ID (step 203).

Figure 3:
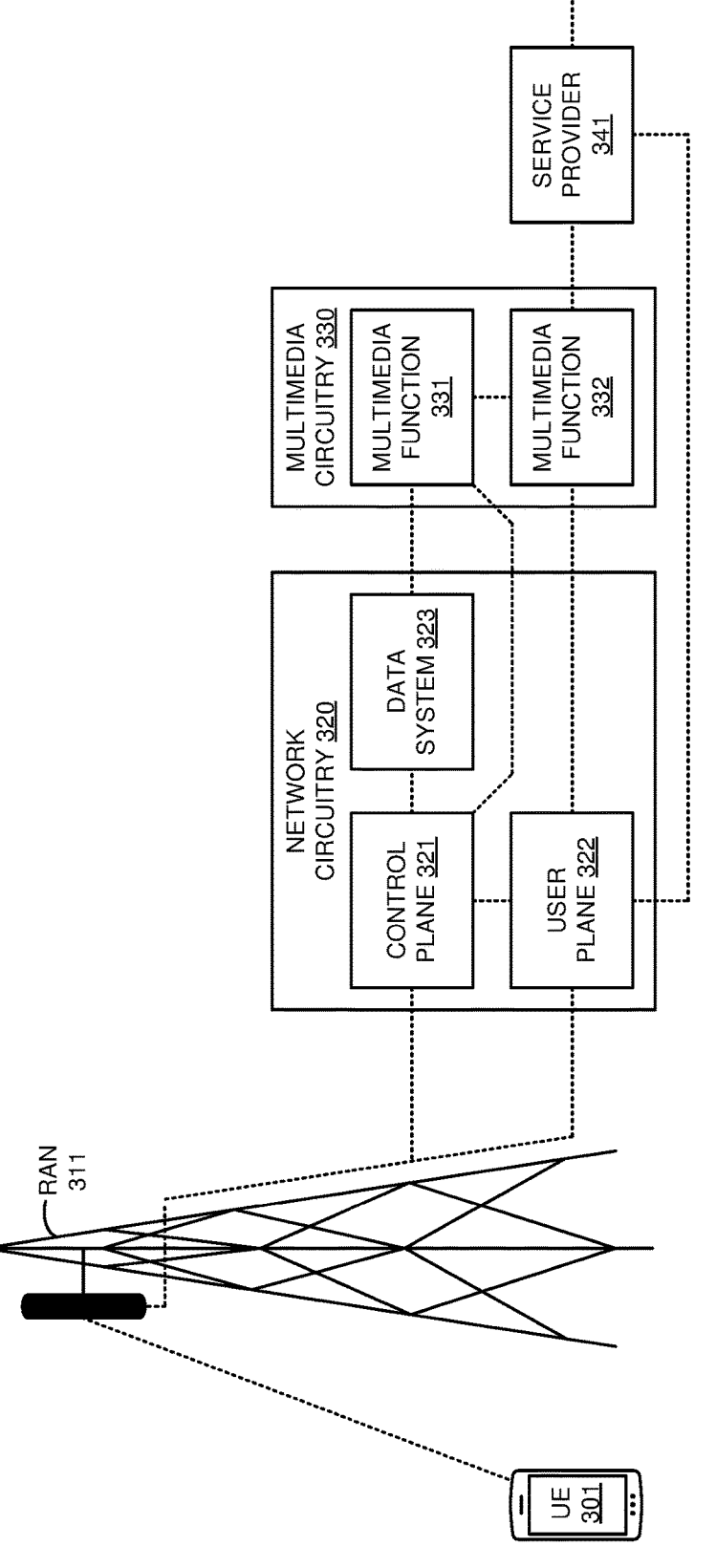
FIG. 3 illustrates a wireless communication network to support network slicing in a multimedia system.

FIG. 3 illustrates wireless communication network 300 network to support network slicing in a multimedia system. Wireless communication network 300 is an example of wireless network 100, however network 100 may differ. Wireless communication network 300 comprises (User Equipment) UE 301, Radio Access Network (RAN) 311, network circuitry 320, multimedia circuitry 330, and service provider 341. Network circuitry 320 comprises control plane 321, user plane 322, and data system 323. Multimedia circuitry 330 comprise multimedia function 331 and multimedia function 332. In other examples, wireless network 300 may comprise additional or different elements than those illustrated in FIG. 3.

In some examples, UE 301 attaches to network circuitry 320 over RAN 311. UE 301 generates and transfers a multimedia registration request for delivery to control plane 321. Control plane 321 forwards the registration request to multimedia function 331. For example, the registration request may comprise an IMS registration request and multimedia circuitry 330 may comprise an IMS core. Multimedia function 331 extracts a UE ID for UE 301 from the registration request. Multimedia function 331 transfers a request to data system 323 for subscription information for UE 301. For example, multimedia function 331 may request slice information like allowed Network Slice Selection Assistance Information (NSSAIs) for UE 301, slice ID of the network slice used by UE 301, or other types of slice related user subscription data. Data system 323 correlates the UE ID for UE 301 to a subscriber profile that stores slice information for UE 301. In some examples, data system 323 may interact with control plane 321 to determine slice information for UE 301. Data system 323 transfers the slice information to multimedia function 331. Multimedia function 331 caches the slice information in association with the UE ID in memory. By caching the slice information for UE 301 in association with the UE ID for UE 301, communication network 301 extends network slicing into multimedia circuitry 330.

Advantageously, wireless communication network 300 efficiently implement wireless network slicing in multimedia circuitry 330. Moreover, the multimedia circuitry effectively guarantees a minimum Quality-of-Service (QOS) to UE 301 during multimedia sessions like voice calling or video conferencing.

UE 301 and RAN 311 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 311, network circuitry 320, multimedia circuitry 330, and service provider 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliances with wireless and/or wireline communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF, edge UPF, and the like. Data system 323 comprises network elements Home Subscriber Servicer (HSS), Unified Data Management (UDM), and the like. Multimedia function 331 comprises an IMS function like Proxy-Call State Control Function (P-CSCF). Multimedia function 332 comprises IMS functions like Serving-Call State Control Function (S-CSCF) and Interrogating-Call State Control Function (I-CSCF). Service provider 341 comprises an application server or data endpoint that provides a multimedia service for UE 301 like an Application Server (AS). In some examples, service provider 341 may comprise a proxy system to facilitate communications between UE 301 and another UE. For example, service provider may comprise another multimedia system associated with another wireless communication network.

UE 301, RAN 311, control plane 321, user plane 322, data system 323, multimedia functions 331-332, and service provider 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

FIG. 4 illustrates process 400. Process 400 comprises an exemplary operation of wireless communication network 300 to support network slicing in a multimedia system. The operation may vary in other examples. The operations of process 400 comprise an IMS function receiving an IMS registration message indicating a UE ID (step 401). The operations further comprise the IMS function transferring a request for UE subscription information to a network data system (step 402). The operations further comprise the network data system receiving the request, correlating the UE ID with a slice ID associated with the UE, and indicating the slice ID to the IMS function (step 403). The operations further comprise the IMS function receiving the slice ID form the network data system and responsively caching the slice ID in association with the UE ID (step 404).

Figure 5:
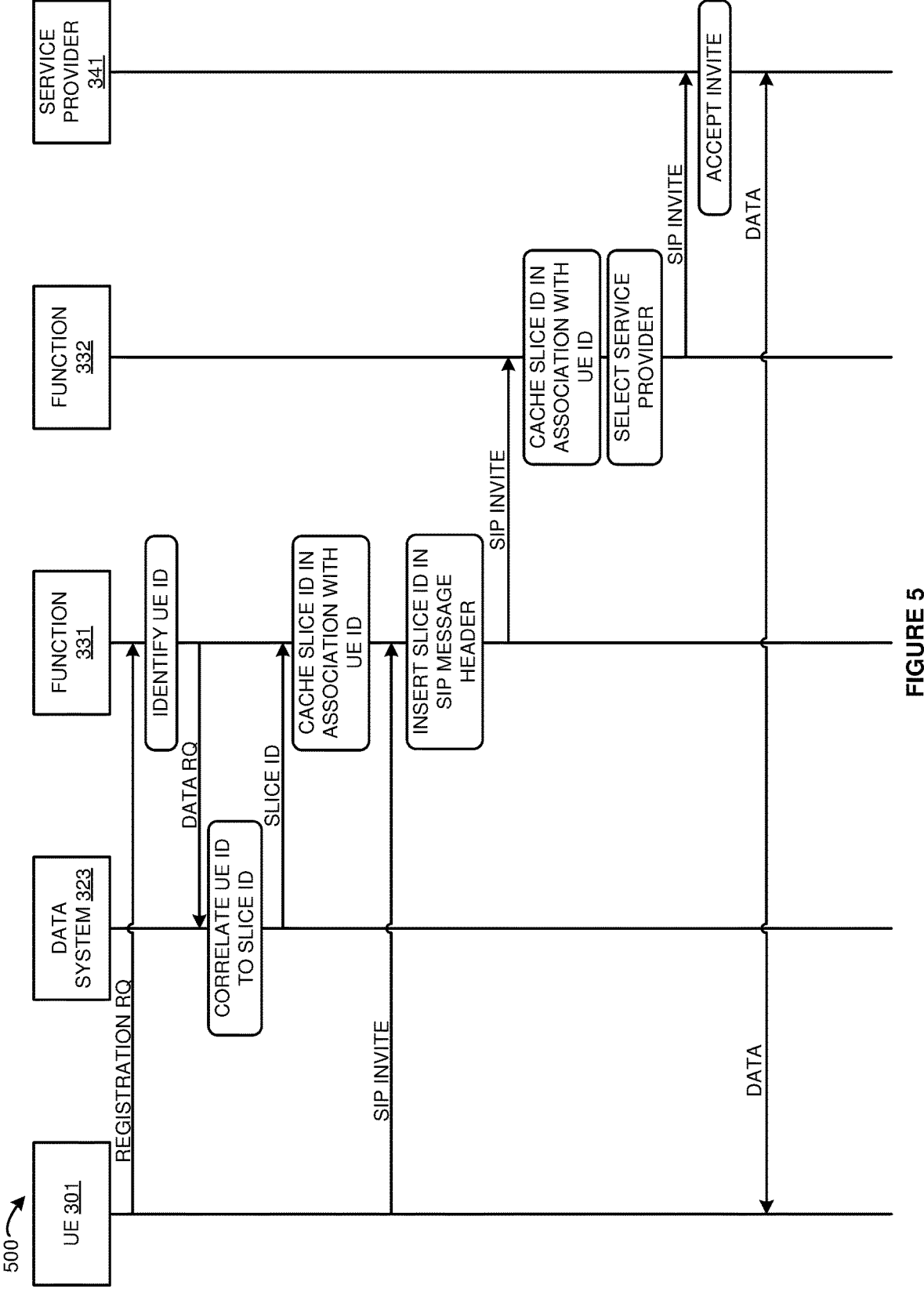
FIG. 5 illustrates an exemplary operation of the wireless communication network to support network slicing in a multimedia system.

FIG. 5 illustrates an exemplary operation of wireless communication network 300 to support network slicing in a multimedia system. The operation may vary in other examples. In operation, UE 301 attaches to network circuitry 320 over RAN 311. UE 301 generates and transfers an IMS registration request (RQ) for delivery to control plane 321. The IMS registration request indicates a UE ID that uniquely identifies UE 301. Control plane 321 detects the IMS registration and forwards the IMS registration to multimedia function 331. For example, multimedia function 331 may comprise a P-CSCF and control plane 321 may select the P-CSCF to register UE 301 with multimedia circuitry 330. Multimedia function 331 identifies the UE ID in the registration request and transfers a slice data request for UE 301 to data system 323. Data system 323 correlates the UE ID to a subscriber profile that indicates the slice ID of the network slice assigned to UE 301. Data system 323 transfers the slice ID to multimedia function 331. Multimedia function 331 caches the slice ID in association with the UE ID in memory.

Once registered with multimedia circuitry 330, UE 301 generates and transfers a Session Initiation Protocol (SIP) invite to control plane 321 to initiate a voice calling session with service provider 341. Control plane 321 receives the SIP invite and transfers the SIP invite to multimedia function 331. Multimedia function 331 processes the SIP invite and selects multimedia function 332 to setup the voice-calling session for UE 301. Multimedia function 331 retrieves the slice ID for UE 301 from memory and inserts the slice ID into the message header of the SIP invite. Multimedia function 331 transfers the SIP invite to multimedia function 332. Multimedia function 332 reads the message header and extracts the slice ID. Multimedia function 332 caches the slice ID in association with the UE ID in memory. Multimedia function 332 selects service provider 341 based on the SIP invite. Multimedia function 332 transfers the SIP invite with the slice ID in the message header to service provider 341. Service provider 341 accepts the SIP invite and caches the slice ID in association with the UE ID for UE 301 in memory. Multimedia function 332 transfers session context information to control plane 321 to begin the session. Control plane 321 indicates the session context to UE 301 and controls user plane 322 to serve the session. UE 301 and service provider 341 begin the voice calling session exchange user data over RAN 311 and user plane 322.

Figure 6:
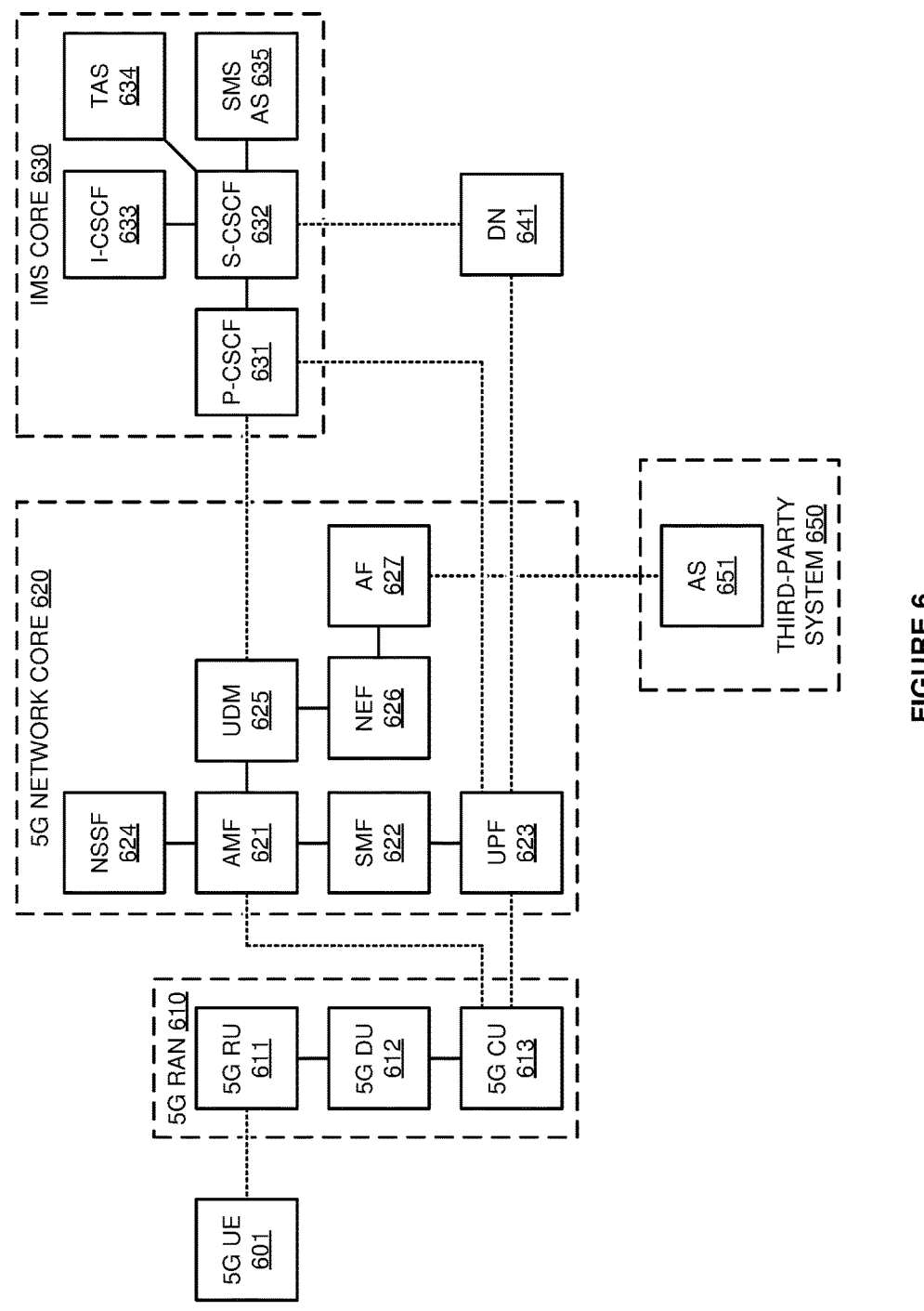
FIG. 6 illustrates a Fifth Generation (5G) communication network to support network slicing in an Internet Protocol Multimedia Subsystem (IMS) core.

FIG. 6 illustrates 5G communication network 600 to support network slicing in an Internet Protocol Multimedia Subsystem (IMS) core. 5G communication network 600 comprises an example of wireless communication networks 100 and 300, although networks 100 and 300 may differ. 5G communication network 600 comprises UE 601, 5G RAN 610, 5G network core 620, IMS core 630, data network (DN) 641, and third-party system 650. 5G RAN 610 comprises 5G Radio Unit (RU) 611, 5G Distributed Unit (DU) 612, and 5G Centralized Unit (CU) 613. 5G network core 620 comprises AMF 621, SMF 622, UPF 623, NSSF 624, UDM 625, NEF 626, and AF 627. IMS core 630 comprises P-CSCF 631, S-CSCF 632, I-CSCF 633, Telephony Application Server (TAS) 634, and Short Message Service Application Server (SMS AS) 635. Third-party system 650 comprises Application Server (AS) 651. Other network functions and network elements like Network Repository Function (NRF), Policy Control Function (PCF), Authentication Server Function (AUSF), Unstructured Network Data Repository (UDR), and Home Subscriber Service (HSS) are typically present in and 5G network core 620 but are omitted for clarity. In this example, UE 601 is associated with third-party system 650. For example, third-party system 650 may comprise a commercial enterprise and UE 601 may comprise the mobile device of a person employed by the commercial enterprise. In some examples, UDM 625 may be replaced by, or used in addition with, an HSS. In other examples, wireless network communication network 600 may comprise additional or different elements than those illustrated in FIG. 6.

Third-party AS 651 generates and transfers signaling to AF 627 that indicates a UE ID and service attributes for UE 601. The service attributes indicate minimum Quality-of-Service (QOS), guaranteed bit rate, slice IDs, and the like. In this example, the service attributes specify that UE 601 qualifies for an IMS network slice to guarantee a minimum QoS level during IMS sessions like voice calling using Voice Over New Radio (VoNR), video conferencing, or Short Message Service (SMS) messaging. AF 627 interfaces with third-party AS 651 and forwards the signaling to NEF 626. NEF 626 processes the signaling and exposes the UE ID and service attributes for UE 601 to UDM 625. UDM 625 correlates the UE ID to a subscriber profile for UE 601 and modifies the service attributes in the subscriber profile using the service attributes received from third-party AS 651.

UE 601 wirelessly attaches to CU 613 via DU 612 and RU 611. UE 601 exchanges attachment signaling with CU 613 to establish a Radio Resource Control (RRC) connection with 5G network applications hosted by CU 613. The attachment signaling indicates information like a registration type, UE capabilities, requested slice types, and PDU session requests. CU 613 transfers a registration request for UE 601 to AMF 621. The registration request comprises the information transferred by UE 601 in the attachment signaling. AMF 621 transfers an identity request to UE 601 via RAN 610. UE 601 responsively indicates its identity to AMF 621 via RAN 610. AMF 621 interacts with UDM 625 and typically other network functions like AUSF to authenticate and authorize UE 601 for wireless data service.

Responsive to the authentication and authorization, AMF 621 retrieves the service attributes sent by third-party AS 651, Quality-of-Service (QOS) metrics, allowed slice identifiers, and the like from UDM 625. AMF 621 interfaces with NSSF 624 to select a network slice for UE 601. NSSF 624 processes the service attributes and identifies an IMS network slice for UE 601 based on the service attributes. NSSF 624 indicates the slice ID for the IMS network slice to AMF 621 and to UDM 625. UDM 625 stores the slice ID for the selected network slice in the subscriber profile for UE 601. AMF 621 selects SMF 622 to serve UE 601 based on the slice ID. SMF 622 selects P-CSCF 631 and UPF 623 based on the slice ID. SMF 622 indicates the network addresses for UPF 623 and P-CSCF 631 to AMF 621. AMF 621 generates UE context for UE 601 using the received information. The UE context comprises the service attributes sent by third-party AS 651, the QoS metrics, the slice ID, the network addresses, and the like. AMF 621 transfers the UE context to UE 601 over RAN 610.

UE 601 initiates an IMS registration request to register with IMS core 630. UE 601 generates a SIP registration message and uses the network address P-CSCF 631 in the UE context to transfer the SIP registration message to CU 613 over RU 611 and DU 612. The SIP registration message indicates the UE ID for UE 601. CU 613 transfers the SIP message to UPF 623. UPF 623 identifies the network address in the SIP message and transfers the SIP message to P-CSCF 631. P-CSCF 631 receives the SIP registration message and detects the UE ID of UE 601. In response, P-CSCF 631 transfers a Representation States Transfer Interface (REST) message to UDM 625 for subscriber information for UE 601. P-CSCF 631 uses the 5G Service Based Architecture (SBA) to transfer the REST message to UDM 625. UDM 625 receives the REST message and accesses the subscriber profile for UE 601 to determine the slice ID for UE 601. UDM 625 transfers a response to the REST message to P-CSCF 631 that indicates the slice ID for the network slice used by UE 601. P-CSCF 631 associates the slice ID with the UE ID for UE 601 and caches the slice ID in memory. In caching the slice ID, P-CSCF 631 may reserve itself and the other IMS functions to serve UE 601 over a dedicated IMS slice to guarantee a QoS level for UE 601 during IMS voice and SMS sessions. P-CSCF 631 modifies the header of the SIP registration message to include the slice ID for UE 601. P-CSCF 631 forwards the modified SIP registration message S-CSCF 632 to complete the IMS registration procedure. S-CSCF 632 associates the slice ID with the UE ID for UE 601 and caches the slice ID in memory. S-CSCF 632 interacts with the other IMS functions like I-CSCF 633 to authenticate and authorize UE 601 for IMS voice and IMS texting services. S-CSCF 632 transfers a registration accept message to UE 601 over 5G network core 620 and 5G RAN 610.

Once registered, UE 601 initiates a Mobile Originated (MO) IMS voice session (or some other type of IMS media session) with IMS core 630. UE 601 generates a SIP invite message and addresses the message for delivery to P-CSCF 631. UE 601 transfers the SIP invite to CU 613 over RU 611 and DU 612. CU 613 transfers the SIP invite to UPF 623. UPF 623 forwards the SIP invite message to P-CSCF 631 based on the address.

P-CSCF 631 receives the SIP invite and detects that the invite was sent by UE 601. In response, P-CSCF 631 retrieves the slice ID from memory and modifies the SIP invite message header to include the slice ID. P-CSCF 631 forwards the modified SIP invite message to S-CSCF 632. S-CSCF 632 identifies the slice ID in the message header. S-CSCF 632 interacts with one or more of I-CSCF 633, TAS 634, and SMS AS 635 to orchestrate the IMS slice. S-CSCF 632 processes the SIP invite to select a message destination to setup the MO IMS session. S-CSCF 632 transfers the SIP invite to an application server in data network 641. The application server accepts the SIP invite and caches the slice ID in memory to set up an end-to-end IMS network slice dedicated to UE 601. In this example, the end-to-end IMS network slice includes AMF 621, SMF 622, UPF 623, CSCFs 631-633, and the application service in data network 641. S-CSCF 632 indicates the acceptance to UE 601 over 5G core network 620. UE 601 exchanges user data for the MO IMS voice session with UPF 623 over RAN 610. UPF 623 exchanges the user data for the MO IMS voice session with the application server in data network 641. S-CSCF 632 monitors the MO IMS voice session to control the data flow between UE 601 and data network 641.

Figure 7:
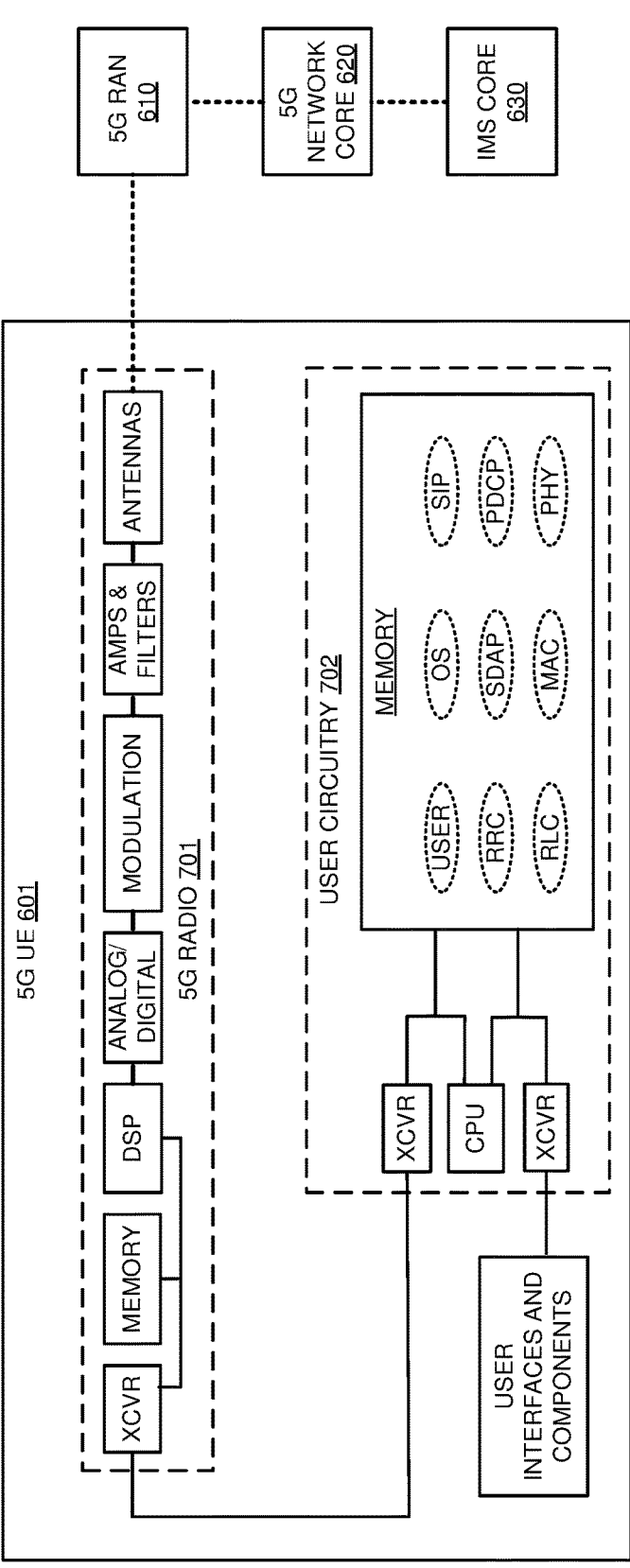
FIG. 7 illustrates a 5G User Equipment (UE) in the 5G communication network.

FIG. 7 illustrates 5G UE 601 in 5G communication network 600. UE 601 comprises an example of user device 101 illustrated in FIG. 1 and UE 301 illustrated in FIG. 3, however user device 101 and UE 301 may differ.

UE 601 comprises 5G radio 701 and user circuitry 702. Radio 701 comprises antennas, amplifiers, filters, modulation, analog-to-digital interfaces, Digital Signal Processors (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), Radio Resource Control (RRC), and Session Initiation Protocol (SIP). The antenna in radio 701 is wirelessly coupled to 5G RAN 610 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving. Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping. Fast Fourier Transforms (FFTs)/Inverse FFTs (IFFTs), and Discrete Fourier Transforms (DFTs)/Inverse DFTs (IDFTs). SIP functions comprise generating SIP invite messages and processing received SIP messages.

Figure 8:
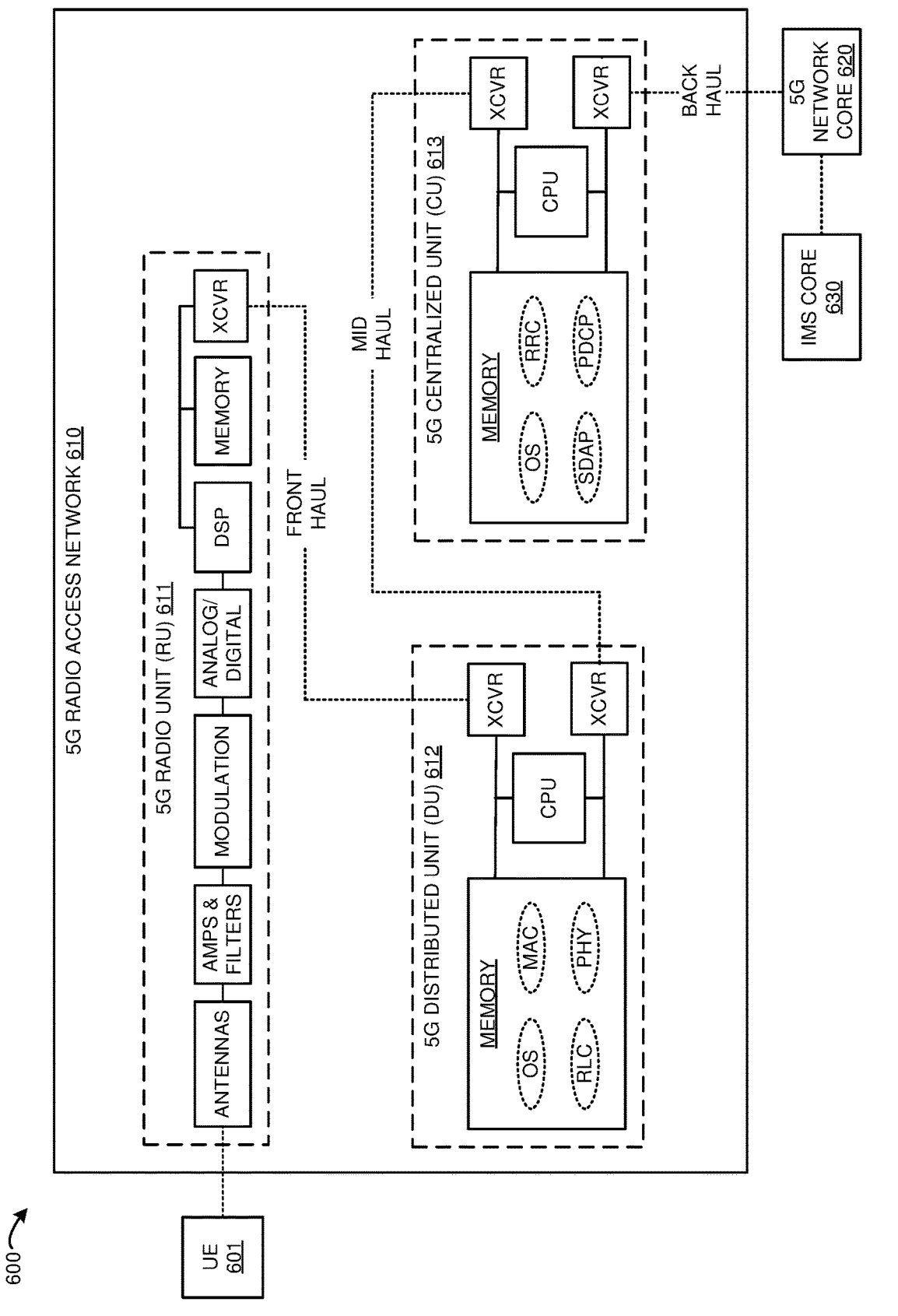
FIG. 8 illustrates a 5G Radio Access Network (RAN) in the 5G communication network.

FIG. 8 illustrates 5G RU 611, 5G DU 612, and 5G CU 613 in 5G communication network 600. RU 611, DU 612, and CU 613 comprise an example of access network 111 illustrated in FIG. 1 and RAN 311 illustrated in FIG. 3, however access network 111 and RAN 311 may differ.

RU 611 comprises antennas, amplifiers, filters, modulation, analog-to-digital interfaces, DSP, memory, and transceivers (XCVRs) that are coupled over bus circuitry. UE 601 is wirelessly coupled to the antennas in RU 611 over 5GNR links. Transceivers in 5G RU 611 are coupled to transceivers in 5G DU 612 over fronthaul links like enhanced Common Public Radio Interface (eCPRI). The DSPs in RU 611 executes their operating systems and radio applications to exchange 5GNR signals with UE 601 and to exchange 5GNR data with DU 612.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 612 over the transceivers.

For the downlink, the DSPs receive downlink 5GNR symbols from DU 612. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 612 comprises memory, CPU, and transceivers that are coupled over bus circuitry. The memory in 5G DU 612 stores operating systems and 5GNR network applications like PHY, MAC, and RLC. CU 613 comprises memory, CPU, and transceivers that are coupled over bus circuitry. The memory in CU 613 stores an operating system and 5GNR network applications like PDCP, SDAP, and RRC. Transceivers in 5G DU 612 are coupled to transceivers in RU 611 over front-haul links. Transceivers in DU 612 are coupled to transceivers in CU 613 over mid-haul links. A transceiver in CU 613 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
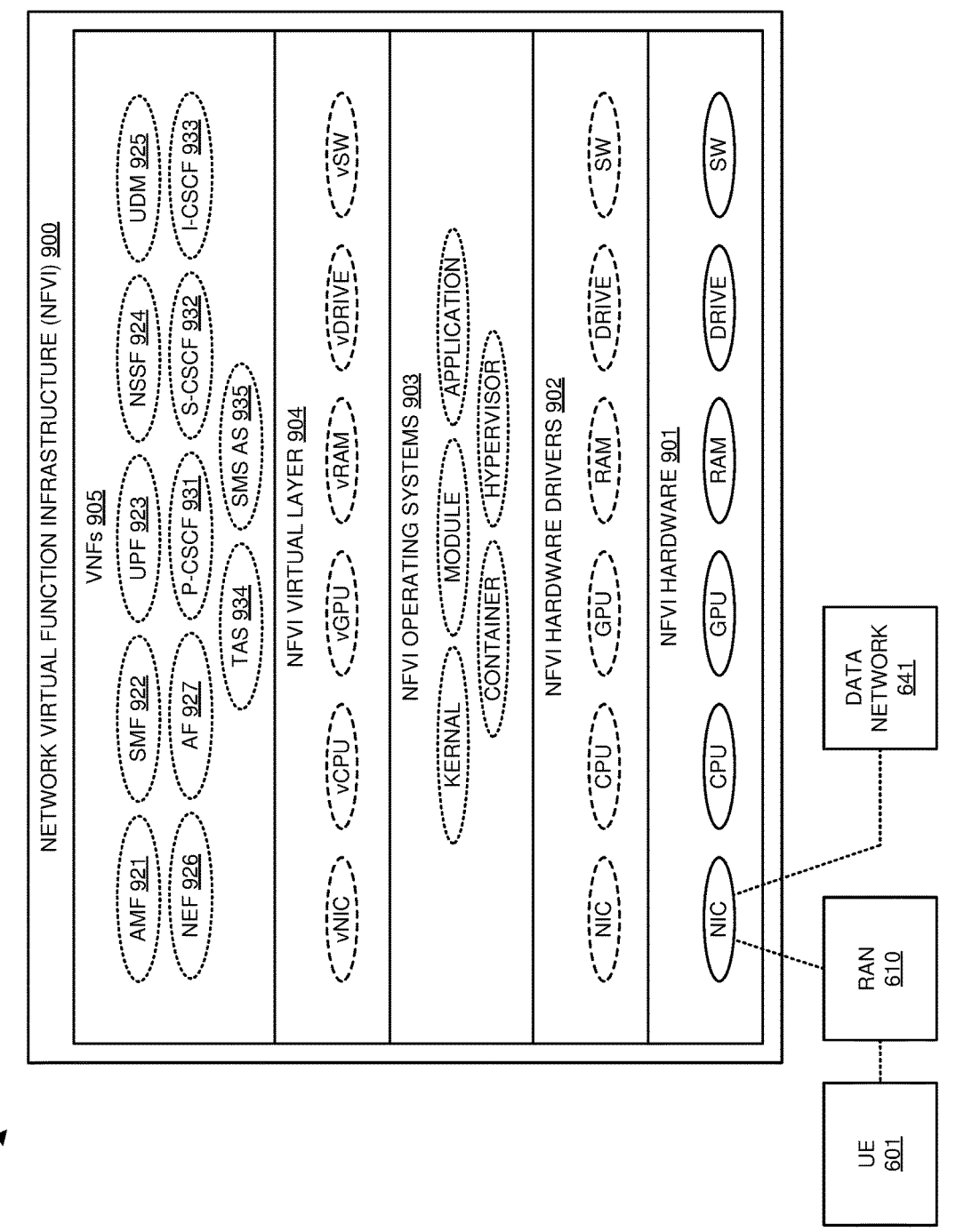
FIG. 9 illustrates a Network Function Virtualization Infrastructure (NFVI) in the 5G communication network.

FIG. 9 illustrates Network Function Virtualization Infrastructure (NFVI) 900. NFVI 900 comprises an example of core network 121 and multimedia system 131 illustrated in FIG. 1 and network circuitry 320 and multimedia circuitry 330 illustrated in FIG. 3, although core network 121, multimedia system 131, network circuitry 320, and multimedia circuitry 330 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, vGPU, vRAM, vDRIVE, and vSW. NFVI VNFs 905 comprise AMF 921, SMF 922, UPF 923, NSSF 924, UDM 925, NEF 926, AF 927, P-CSCF 931, S-CSCF 932, I-CSCF 933, TAS 934, and SMS AS 935. Additional VNFs and network elements like AUSF, PCF, NRF, and UDR are typically present but are omitted for clarity. NFVI 900 may be located at a single site or be distributed across multiple geographic locations. For example, a first portion of NFVI 900 may be located at a first geographic location dedicated to the network functions in 5G network core 620 while a second portion of NFVI 900 may be located at a second geographic location dedicated to the IMS functions in IMS core 630. The NIC in NFVI hardware 901 is coupled to RAN 610 and data network 641. The NIF in NFVI hardware 901 is also coupled to AS 651 however this connection and AS 651 are omitted for clarity. NFVI hardware 901 executes NFVI hardware drivers 902, NFVI operating systems 903, NFVI virtual layer 904, and NFVI VNFs 905 to form AMF 621, SMF 622, UPF 623, NSSF 624, UDM 625, NEF 626, AF 627, P-CSCF 631, S-CSCF 632, I-CSCF 633, TAS 634, and SMS AS 635.

Figure 10:
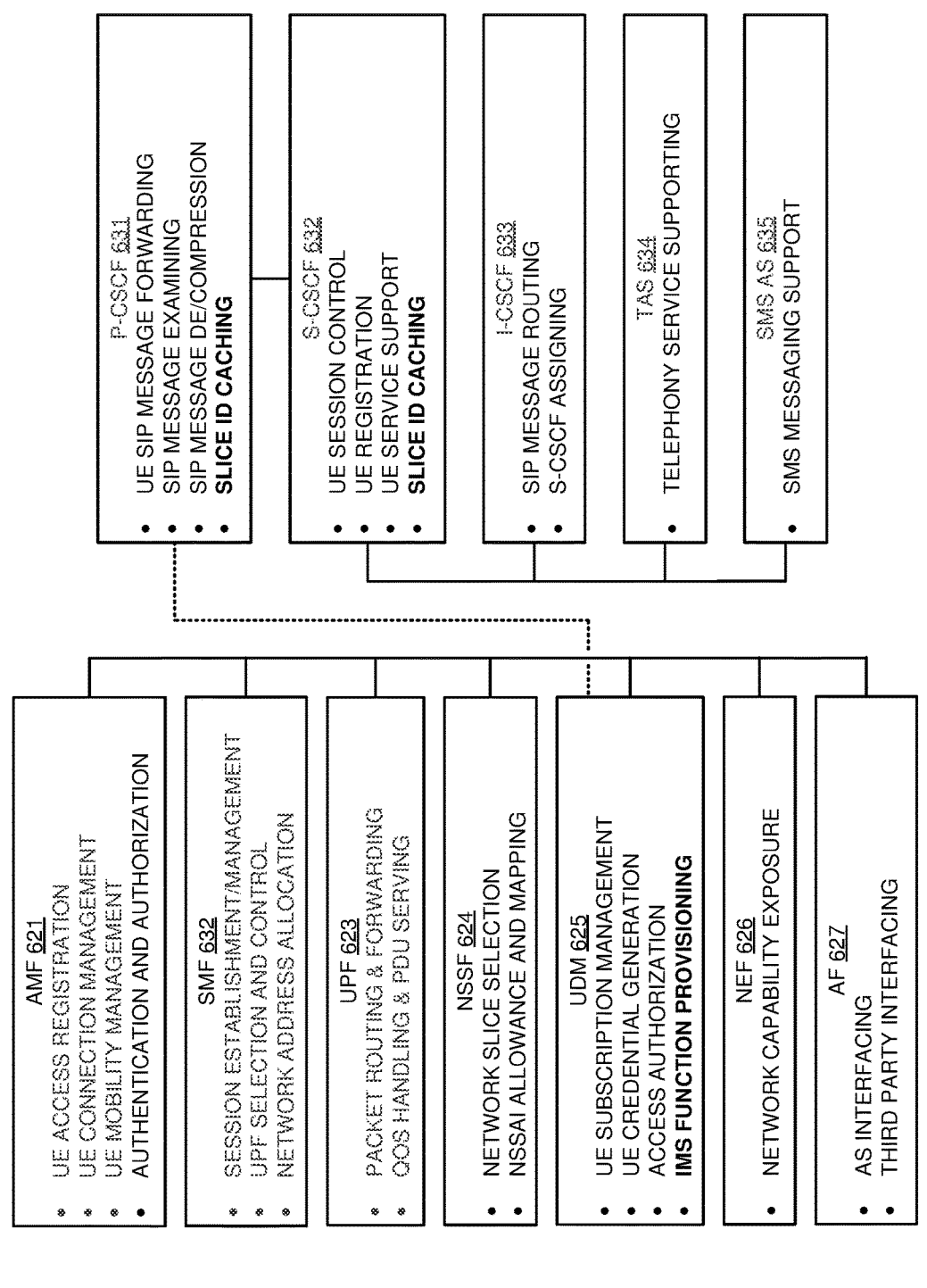
FIG. 10 further illustrates the NFVI in the 5G communication networks.

FIG. 10 further illustrates NFVI 900 in 5G communication network 600. AMF 621 performs UE access registration, UE connection management, UE mobility management, and authentication and authorization. SMF 622 performs session establishment and management, UPF selection and control, and network address allocation. UPF 623 performs packet routing and forwarding and QoS handling and PDU serving. NSSF 624 performs network slice selection and NSSAI allowance and mapping. UDM 625 performs UE subscription management, UE credential generation, access authorization, and IMS function provisioning. NEF 626 performs network capability exposure. AF 627 performs AS interfacing and third-party interfacing. P-CSCF 631 performs UE SIP message forwarding, SIP message examining, SIP message compression/decompression, and slice ID caching. S-CSCF 632 performs UE session control, UE registration, UE service supporting, and slice ID caching. I-CSCF 633 performs SIP message routing and S-CSCF assigning. TAS 634 performs telephony service supporting. SMS AS 635 performs SMS messaging support.

In operation, AF 627 interfaces with third-party AS 651 to receive service attributes for UE 601. The service attributes specify that UE 601 qualifies for an IMS network slice to guarantee a minimum QoS level during IMS voice calling sessions. AF 626 transfers the service attributes to NEF 626. NEF 626 exposes service attributes for UE 601 to UDM 625.

UDM 625 modifies service attributes stored in the subscriber profile for UE 601 using the service attributes received from third-party AS 651.

AMF 621 receives a registration request from UE 601. The registration request indicates a registration type, UE capabilities, requested slice types, and PDU session requests, and the like. AMF 621 responds with an identity request to UE 601 via RAN 610. AMF 621 receives an identify indication from UE 601. AMF 621 interacts with other network functions to authenticate and authorize UE 601 for wireless data service. Responsive to the authentication and authorization, AMF 621 retrieves service metrics from UDM 625 that include the service attributes sent by third-party AS 651 and/or other service information that characterizes the wireless data service to UE 601. AMF 621 interfaces with NSSF 624 to select a network slice for UE 601. NSSF 624 processes the service attributes and identifies an IMS network slice for UE 601 based on the service attributes. NSSF 624 indicates the slice ID for the IMS network slice to AMF 621 and to UDM 625. UDM 625 caches the slice ID in the subscriber profile for UE 601. AMF 621 selects SMF 622 to serve UE 601 based on the slice ID. SMF 622 selects P-CSCF 631 based on the slice ID. SMF 622 also selects UPF 623 based on the slice ID and the service attributes. SMF 622 indicates the network addresses for UPF 623 and P-CSCF 631 to AMF 621. AMF 621 generates UE context for UE 601. The UE context comprises the service attributes sent by third-party AS 651, the slice ID, the network addresses, and/or the other information that characterizes the wireless service delivery to UE 601. AMF 621 transfers the UE context for delivery to UE 601.

UPF 623 receives an SIP registration request sent by UE 601. The SIP registration message is addressed for P-CSCF 631 and indicates the UE ID for UE 601. UPF 623 identifies the network address in the SIP message and transfers the SIP message to P-CSCF 631. P-CSCF 631 receives the SIP registration message and detects the UE ID of UE 601. In response, P-CSCF 631 transfers a REST message to UDM 625 for the slice ID used by UE 601. UDM 625 retrieves slice ID from the subscriber profile of UE 601. UDM 625 transfers the slice ID for UE 601 to P-CSCF 631. P-CSCF 631 associates the slice ID with the UE ID for UE 601 and caches the slice ID in memory. By caching the slice ID, P-CSCF 631 may reserve itself and other IMS functions for use in a dedicated IMS network slice to serve UE 601 during an IMS voice, video, or texting session. P-CSCF 631 modifies the header of the SIP registration message to include the slice ID for UE 601. P-CSCF 631 forwards the modified SIP registration message S-CSCF 632 to complete the IMS registration procedure. S-CSCF 632 receives the modified SIP registration request and caches the slice ID in memory. S-CSCF 632 interacts with the other IMS functions like I-CSCF 633 to authenticate and authorize UE 601 for IMS voice and IMS texting services. S-CSCF 632 transfers a registration accept message for delivery to UE 601.

UPF 623 receives a SIP invite message for a MO IMS voice session generated by UE 601 and addressed for P-CSCF 631. UPF 623 transfers the SIP invite message to P-CSCF 631 based on the address. P-CSCF 631 receives the SIP invite and detects that the invite was sent by UE 601. P-CSCF 631 retrieves the slice ID from memory and modifies the message header of the SIP invite to include the slice ID. P-CSCF 631 forwards the modified SIP invite message to S-CSCF 632. S-CSCF 632 identifies the slice ID in the message header. S-CSCF 632 interacts with I-CSCF 633 and TAS 634 to build the IMS slice. S-CSCF 632 identifies the message destination as data network 641 based on the SIP invite. S-CSCF 632 transfers the SIP invite to an application server in data network 641. The application server accepts the SIP invite and caches the slice ID in memory to set up an end-to-end IMS network slice dedicated to UE 601. S-CSCF 632 transfers an MO IMS acceptance message for delivery to UE 601. UPF 623 exchanges user data for the MO IMS voice session with UE 601 over RAN 610. UPF 623 exchanges the user data for the MO IMS voice session with the application server in data network 641.

Figure 11:
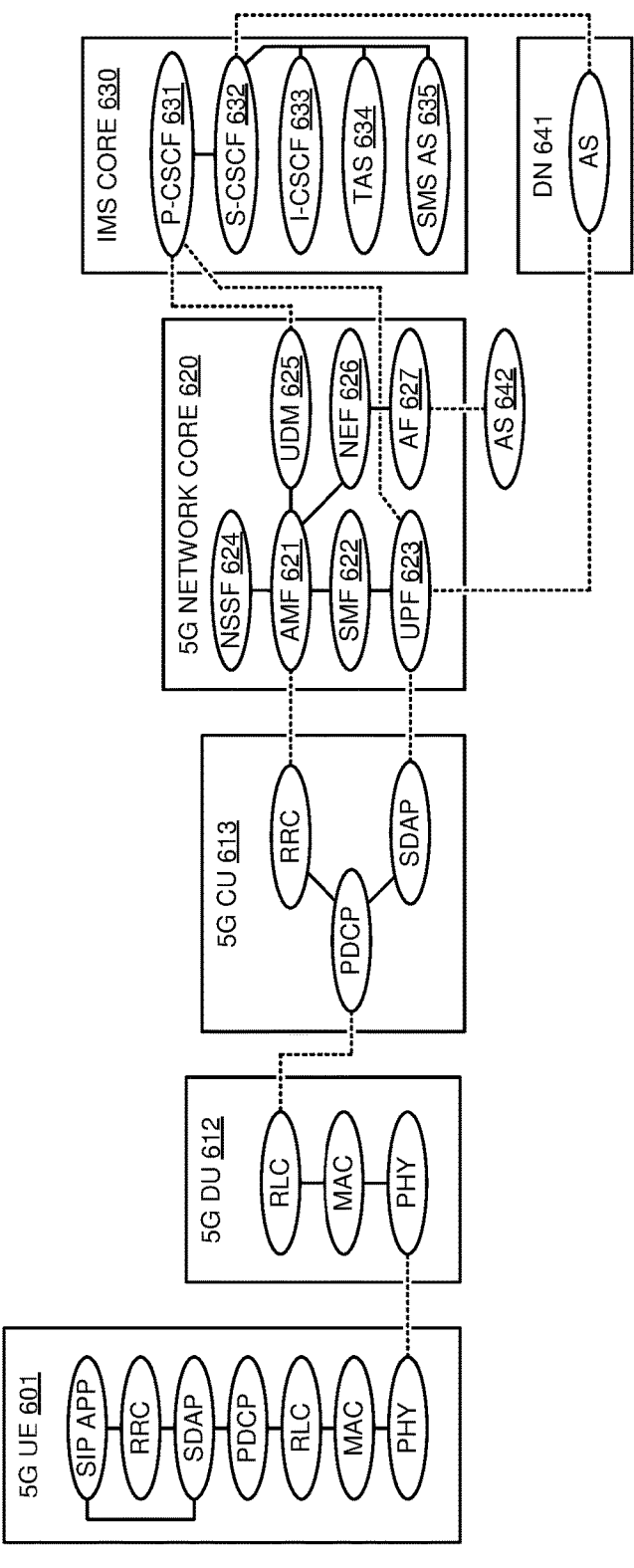
FIG. 11 illustrates an exemplary operation of the 5G communication network to support network slicing in the IMS core.

FIG. 11 illustrates an exemplary operation of 5G communication network 600 to estimate downlink speeds for wireless user devices. The operation may vary in other examples.

Third-party AS 651 generates and transfers signaling to AF 627. The signaling indicates a UE ID and service attributes for UE 601. The service attributes comprise service attributes that specify UE 601 qualifies for an IMS network slice. AF 627 interfaces with third-party AS 651 and forwards the signaling to NEF 626. NEF 626 processes the signaling and exposes the UE ID and service attributes for UE 601 to UDM 625. UDM 625 modifies the service attributes in the subscriber profile for UE 601 using the service attributes received from third-party AS 651.

In response to the execution of a user application, the RRC in UE 601 wirelessly attaches to the RRC in CU 613 over the PDCPs, RLCs, MACs, and PHYs. The attachment signaling indicates a registration type, UE capabilities, requested slice types, and PDU session requests for UE 601. AMF 621 interacts with the other network functions to authenticate and authorize UE 601 for wireless data service. Responsive to the authentication and authorization, AMF 621 retrieves the service attributes sent by third-party AS 651, QOS metrics, and allowed slice identifiers from UDM 625. AMF 621 interfaces with NSSF 624 to select a network slice for UE 601. NSSF 624 processes the service attributes and selects an IMS network slice for UE 601. NSSF 624 indicates the slice ID for the IMS network slice to AMF 621 and to UDM 625. UDM 625 stores the slice ID in the subscriber profile for UE 601. AMF 621 selects SMF 622 to serve UE 601 based on the slice ID. SMF 622 selects P-CSCF 631 and UPF 623 based on the slice ID, QoS metrics, and requested session types. SMF 622 indicates the network addresses for UPF 623 and P-CSCF 631 to AMF 621. AMF 621 generates UE context for UE 601. The UE context comprises the service attributes sent by third-party AS 651, the QoS metrics, the slice ID, and the network addresses. AMF 621 transfers the UE context to the RRC in CU 613. The RRC in CU 613 wirelessly transfers the UE context to the RRC in UE 601 over the PDCPs, RLCs, MACs, and PHYs.

In response to a user input, the SIP application executes, and UE 601 initiates an IMS registration procedure to register with IMS core 630. The RRC in UE 601 drives the SIP application to generate a SIP registration message. The SDAP in UE 601 addresses SIP registration message using the network address P-CSCF 631 in the UE context. The SDAP transfers the SIP registration message to the SDAP in CU 613 over the PDCPs, RLCs, MACS, and PHYs. The SDAP in CU 613 transfers the SIP message to UPF 623. UPF 623 transfers the SIP message to P-CSCF 631 using the network address for P-CSCF 631. P-CSCF 631 receives the SIP registration message and detects the UE ID of UE 601. In response, P-CSCF 631 requests subscriber information for UE 601 from UDM 625. UDM 625 accesses the subscriber profile for UE 601 to determine the slice ID for UE 601. UDM 625 indicates the slice ID for UE 601 to P-CSCF 631. P-CSCF 631 associates the slice ID with the UE ID for UE 601 and caches the slice ID in memory. P-CSCF 631 modifies the header of the SIP registration message to include the slice ID for UE 601. P-CSCF 631 forwards the SIP registration message S-CSCF 632 to complete IMS registration for UE 601. S-CSCF 632 associates the slice ID with the UE ID for UE 601 and caches the slice ID in memory. S-CSCF 632 interacts with the other IMS functions like I-CSCF 633 to authenticate and authorize UE 601 for IMS voice and IMS texting services. S-CSCF 632 transfers a registration accept message to UPF 623. UPF 623 transfers the registration accept message to the SDAP in CU 613. The SDAP in CU 613 transfers the registration accept message to the SDAP in UE 601 over the PDCPs. RLCs, MACs, and PHYS.

Once registered, UE 601 initiates a MO IMS voice session in response to user input. The RRC in UE 601 controls the SIP application to generate a SIP invite message and addresses the message for delivery to P-CSCF 631. The SDAP in UE 601 transfers the SIP invite to the SDAP in CU 613 over PDCPs, RLCs, MACs, and PHYs. The SDAP in CU 613 transfers the SIP invite to UPF 623. UPF 623 forwards the SIP invite message to P-CSCF 631 based on the address. P-CSCF 631 receives the SIP invite and in response, retrieves the slice ID from memory and modifies the SIP invite message header to include the slice ID. P-CSCF 631 forwards the SIP invite message to S-CSCF 632. S-CSCF 632 identifies the slice ID in the message header. S-CSCF 632 interacts with I-CSCF 633 and TAS 634 to set up the IMS slice. S-CSCF 632 selects a message destination for the MO IMS session based on the SIP invite. S-CSCF 632 transfers the SIP invite to the application server (AS) in data network 641. The application server accepts the SIP invite and caches the slice ID in memory to set up an end-to-end IMS network slice dedicated to the MO IMS voice call session for UE 601. S-CSCF 632 indicates the acceptance to UPF 623. UPF 623 transfers the indication to the SDAP in CU 613. The SDAP in CU 613 transfers the acceptance to the SDAP in UE 601 over the PDCPs, RLCs, MACs, and PHYs. The SDAP in UE 601 exchanges user data for the MO IMS voice session with the SDAP in CU 613. The SDAP in CU 613 exchanges the user data for the MO IMS voice session with UPF 623. UPF 623 exchanges the user data for the MO IMS voice session with the application server in data network 641.

The wireless data network circuitry described above comprises computer hardware and software that form special-purpose network circuitry to support network slicing in multimedia systems like IMS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to support network slicing in multimedia systems such as IMS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to support network slicing in a multimedia system, the method comprising:

A multimedia function receiving a registration request indicating a User Equipment (UE) Identifier (ID) for a UE;

the multimedia function querying a network data system for UE subscription information, wherein the network data system comprises a Unified Data Management (UDM); and the multimedia function receiving slice information from the network data system and responsively caching the slice information in association with the UE ID and the multimedia function receiving a service request sent by the UE;

the multimedia function forwarding the service request, the slice information, and the UE ID to a second multimedia function; and the second multimedia function serving the UE and a service provider.

2. The method of claim 1 further comprising:

the second multimedia function receiving the service request, the slice information, and the UE ID and responsively caching the slice information in association with the UE ID;

the second multimedia function forwarding the service request, the slice information, and the UE ID to the service provider wherein the service provider receives the service request, the slice information, and the UE ID, caches the slice information in association with the UE ID, and serves the UE over the second multimedia function.

3. The method of claim 2 wherein the slice information comprises a slice ID for the UE.

4. The method of claim 2 wherein the service request comprises a Session Initiation Protocol (SIP) message.

5. The method of claim 2 wherein the multimedia function comprises a Proxy-Call State Control Function (P-CSCF)

and the second multimedia function comprises a Serving-Call State Control Function (S-CSCF).

6. The method of claim 2 wherein the service provider comprises an Application Server (AS).

7. The method of claim 1 wherein the network data system comprises the UDM and a Home Subscriber Service (HSS).

8. A wireless communication network configured to support network slicing in a multimedia system, the wireless communication network comprising:

a multimedia function and a network data system, wherein the network data system comprises a Unified Data Management (UDM);

the multimedia function configured to:

receive a registration request indicating a User Equipment (UE) Identifier (ID) of a UE; and query the network data system for UE subscription information;

the network data system configured to correlate the UE ID to slice information associated with a UE and indicate the slice information to the multimedia function; and the multimedia function further configured to receive the slice information from the network data system and responsively cache the slice information in association with the UE ID and a second multimedia function; and wherein:

the multimedia function is further configured to:

receive a service request sent by the UE; and forward the service request, the slice information, and UE ID to the second multimedia function and serves the UE over the second multimedia function; and serve the UE and a service provider.

9. The wireless communication network of claim 8 further comprising: the second multimedia function is configured to:

receive the service request, the slice information, and the UE ID and responsively cache the slice information in association with the UE ID;

forward the service request, the slice information, and the UE ID to the service provider wherein the service provider receives the service request, the slice information, and the UE ID, caches the slice information in association with the UE ID.

10. The wireless communication network of claim 9 wherein the slice information comprises a slice ID for the UE.

11. The wireless communication network of claim 9 wherein the service request comprises a Session Initiation Protocol (SIP) message.

12. The wireless communication network of claim 9 wherein the multimedia function comprises a Proxy-Call State Control Function (P-CSCF) and the second multimedia function comprises a Serving-Call State Control Function (S-CSCF).

13. The wireless communication network of claim 9 wherein the service provider comprises an Application Server (AS).

14. The wireless communication network of claim 8 wherein the network data system comprises the UDM and a Home Subscriber Service (HSS).

15. A method of operating a wireless communication network to support network slicing in an Internet Protocol Multimedia Subsystem (IMS) core, the method comprising:

a Proxy-Call State Control Function (P-CSCF) receiving an IMS registration request indicating a User Equipment (UE) Identifier (ID) for a UE;

the P-CSCF querying a Unified Data Management (UDM) for UE subscription information;

in response to the query, the UDM correlating the UE ID with a slice ID associated with the UE and indicating the slice ID to the P-CSCF; and the P-CSCF receiving the slice ID from the UDM and responsively caching the slice ID in association with the UE ID and the P-CSCF receiving a Session Initiation Protocol (SIP) message sent by the UE; and the P-CSCF retrieving the slice ID, including the slice ID and in a message header of the SIP message, and forwarding the SIP message to a Control-Call State Control Function (C-CSCF) and the C-CSCF serving the UE and an Application Server (AS).

16. The method of claim 15 further comprising:

the C-CSCF receiving the SIP message, identifying the slice ID in the message header, caching the slice ID in association with the UE ID, and selecting the Application Server (AS) based on the SIP message;

the C-CSCF forwarding the SIP message to the AS wherein the AS identifies the slice ID in the message header, caches the slice ID in association with the UE ID, and serves the UE over the C-CSCF.

17. The method of claim 16 wherein the SIP message comprises a SIP invite message.

18. The method of claim 16 wherein the IMS registration request comprises a SIP registration message.

19. The method of claim 2 wherein the slice information comprises allowed Single-Network Slice Selection Assistance Information (S-NSSAI) for the UE.

20. The wireless communication network of claim 9 wherein the slice information comprises allowed Single-Network Slice Selection Assistance Information (S-NSSAI) for the UE.

* * * * *